United States Patent
Wheeler et al.

(10) Patent No.: US 10,394,997 B2
(45) Date of Patent: Aug. 27, 2019

(54) METHOD AND APPARATUS FOR RELOCATING DESIGN MODULES WHILE PRESERVING TIMING CLOSURE

(71) Applicant: Altera Corporation, San Jose, CA (US)

(72) Inventors: Mark Stephen Wheeler, Toronto (CA); Gordon Raymond Chiu, North York (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 16/134,770

(22) Filed: Sep. 18, 2018

(65) Prior Publication Data
US 2019/0065652 A1 Feb. 28, 2019

Related U.S. Application Data

(60) Continuation of application No. 14/922,230, filed on Oct. 26, 2015, now Pat. No. 10,102,326, which is a division of application No. 14/154,623, filed on Jan. 14, 2014, now Pat. No. 9,195,793.

(51) Int. Cl.
*G06F 17/50* (2006.01)

(52) U.S. Cl.
CPC ...... *G06F 17/5072* (2013.01); *G06F 17/5077* (2013.01); *G06F 17/5081* (2013.01); *G06F 2217/84* (2013.01)

(58) Field of Classification Search
CPC .................................................. G06F 17/5072
USPC ........................................................ 716/119
See application file for complete search history.

(56) References Cited

U.S. PATENT DOCUMENTS

| | | | | |
|---|---|---|---|---|
| 6,496,972 B1 * | 12/2002 | Segal | ................ | G06F 17/5045 716/103 |
| 8,281,274 B1 * | 10/2012 | Padalia | ............... | G06F 17/5022 716/132 |
| 8,453,102 B1 * | 5/2013 | Pack | ..................... | G06F 17/505 716/139 |
| 2006/0112355 A1 * | 5/2006 | Pileggi | ............... | G06F 17/5068 716/55 |

* cited by examiner

*Primary Examiner* — Suresh Memula
(74) *Attorney, Agent, or Firm* — Fletcher Yoder, P.C.

(57) ABSTRACT

A method for designing a system on a target device includes generating a solution for the system. A solution for a module of the system identified by a user is preserved. The preserved solution for the module is implemented at a location on the target device identified by the user.

22 Claims, 13 Drawing Sheets

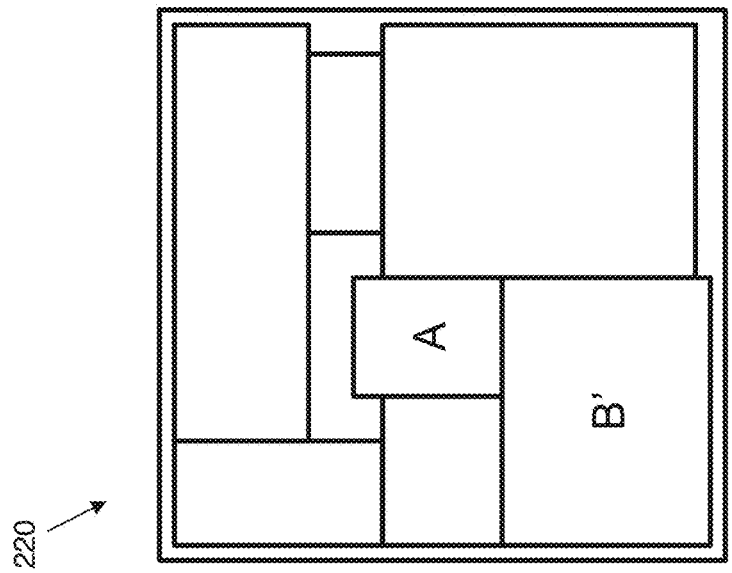
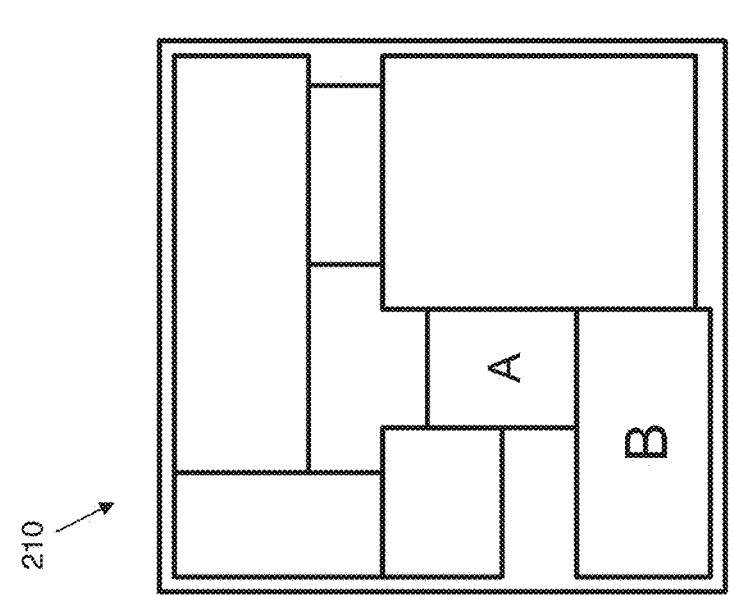
FIG. 2

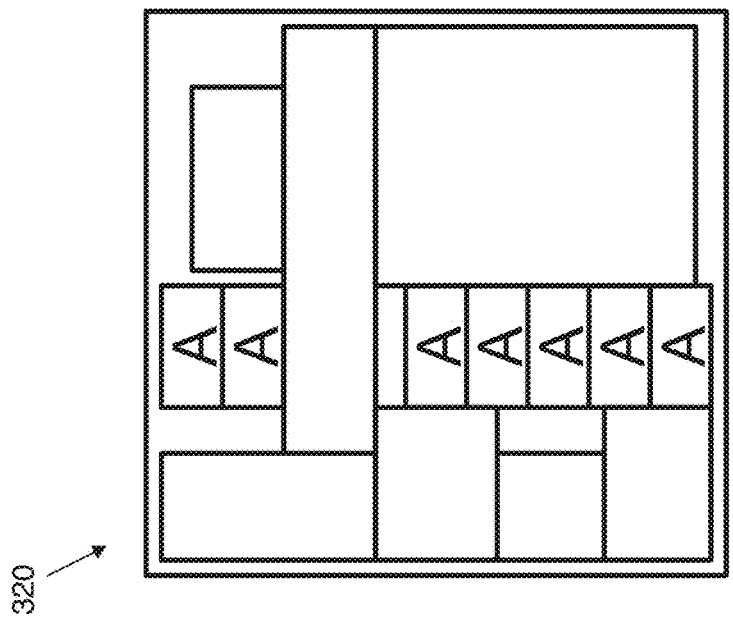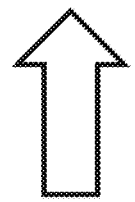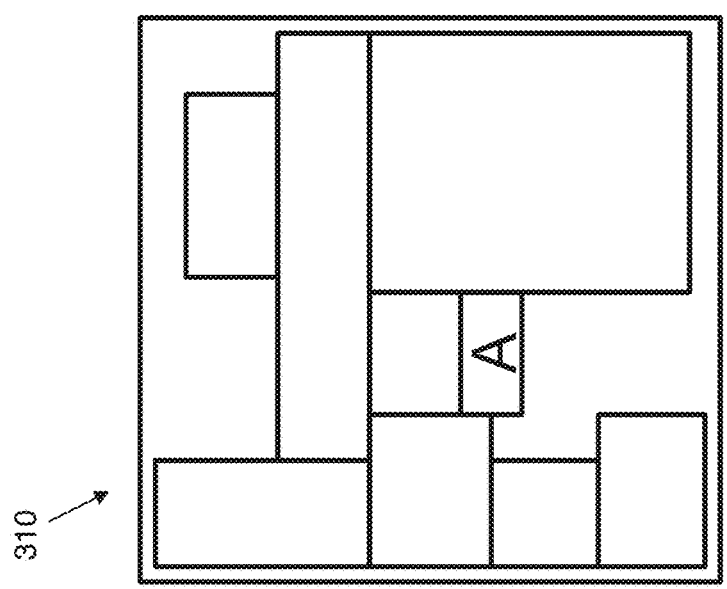
FIG. 3

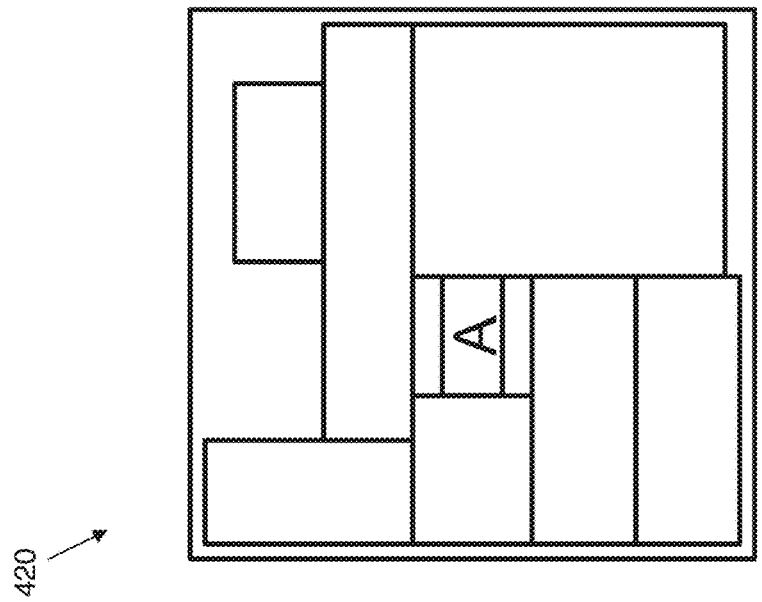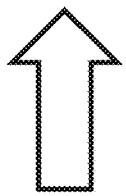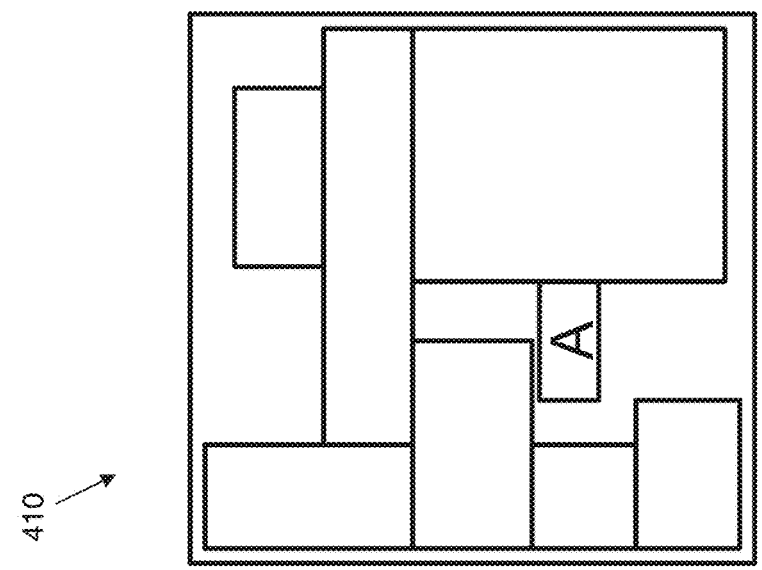
FIG. 4

METHOD AND APPARATUS FOR RELOCATING DESIGN MODULES WHILE PRESERVING TIMING CLOSURE

RELATED APPLICATION

This application is a continuation of U.S. patent application Ser. No. 14/922,230, filed Oct. 26, 2015, entitled "Method and Apparatus for Relocating Design Modules While Preserving Timing Closure," which is a divisional of and claims priority and benefit to U.S. patent application Ser. No. 14/154,623, filed Jan. 14, 2014, entitled, "Method and Apparatus for Relocating Design Modules While Preserving Timing Closure," now U.S. Pat. No. 9,195,793. All prior applications are hereby incorporated by reference herein in their entireties.

TECHNICAL FIELD

Embodiments of the present invention relate to tools for designing systems on target devices. More specifically, embodiments of the present invention relate to a method and apparatus for relocating design modules while preserving the timing closure achieved for the kernels at previous locations.

BACKGROUND

Target devices such as field programmable gate arrays (FPGAs), application specific integrated circuits (ASICs), and structured ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are synthesis, placement, and routing of the system on the target device.

When designing large systems to be implemented on target devices, EDA tools may require a significant amount of time to perform the compilation procedures. The generation of placement and routing solution that allow the system to achieve timing closure may require several iterations before an optimal solution is discovered.

After the compilation or a partial compilation of a design, a designer may wish to update a subset of the design modules ("kernels") in the system. The update may involve relocating a module from a first location of the target device to a second location of the target device, replicating an instance of the module throughout the target device, or importing an optimized module onto a different target device. In the past, these types of updates required that the EDA tool recompile the system and seed-sweep the entire design from scratch. This recompilation required additional time which was costly and undesirable.

SUMMARY

A method and apparatus for relocating design modules while preserving timing closure is disclosed. Embodiments of the present invention utilize an existing solution for placement and/or routing of a module to be displaced without requiring the entire design to be re-compiled. The existing solution for placement and/or routing of the module is translated for the relocation of the module by leveraging the principles of structural regularity and physical regularity of the target device. As a result, by translating the preserved placement and/or routing solution, the time required for re-compiling a design and for achieving timing closure is reduced or eliminated. Furthermore, timing variation across instances of replicated modules may be reduced.

According to a first embodiment of the present invention a method for designing a system on a target device includes generating a solution for the system, preserving a solution for a module of the system identified by a user, and implementing the preserved solution for the module at a location on the target device identified by the user. According to a second embodiment of the present invention a method for designing a system on a target device includes identifying displacement options for a module of the system, translating a solution for the module in response to a displacement option selected by a user, and implementing the solution into the design of the system. According to an aspect of the invention, translating the solution for the module may include computing a displacement vector for the module in response to receiving a displacement location for the module, determining whether any logic elements reside in the module, and for each logic element residing in the module, identify the corresponding location to place the logic element to form a displaced module by applying the displacement vector to the original location of each logic element in the module. Translating the solution may also include determining whether any wires reside in the module, and for each wire residing in the module, selecting the corresponding routing resource to form the displaced module by applying the displacement vector to the original location of each wire in the module.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 2 illustrates an example of module displacement for floorplan relocation according to an embodiment of the present invention.

FIG. 3 illustrates an example of module displacement for module replication according to an embodiment of the present invention.

FIG. 4 illustrates an example of module displacement for IP export/import according to an embodiment of the present invention.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
FIG. 1 is a flow chart illustrating a method for designing a system on a target device with module relocation according to an exemplary embodiment of the present invention.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other programmable device. According to one embodiment, the procedure illustrated in FIG. 1 may be performed by a computer aided design (CAD)/electronic design automation (EDA) tool implemented on a computer system.

At 101, a description of a system is received by the EDA tool. According to an embodiment of the present invention, the description of the system may be in hardware description language (HDL) format provided by a user or by another tool. The description may include components defined by user generated logic ("user logic"). The description may also or alternatively include pre-designed logic in the system.

At 102, the system is synthesized. Synthesis includes generating a logic design of the system to be implemented by the target device. According to an embodiment of the present invention, synthesis generates an optimized logical representation of the system from the HDL design definition. Synthesis also includes mapping the optimized logic design. According to an embodiment of the present invention, a netlist is generated from mapping. This netlist may be an optimized technology-mapped netlist generated from the HDL.

At 103, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic design are to be used for specific logic elements, and other function blocks determined to implement the system as determined during synthesis. Placement may include clustering which involves grouping logic elements together to form the logic clusters present on the target device.

At 104, a determination is made as to whether one or more modules in the system is to be displaced to one or more other ("displaced") locations on the target device. According to an embodiment of the present invention, a user may specify that displacement of a module is desired when the module is to be moved to a different location on the target device, when the module is to be replicated and utilized at different locations on the target device, and/or when a placed solution for a module that is pre-designed by another is to be implemented at a different location on the target device. If one or more modules in the system is to be displaced, control proceeds to 105. If one or more modules in the system is not to be displaced, control proceeds to 106.

At 105, the placement solution for the one or more modules is relocated to the one or more displaced locations. According to an embodiment of the present invention, displacement options are identified for the user, and the placement solution is translated in response to the displacement option selected by the user.

At 106, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 107, a determination is made as to whether one or more modules in the system is to be displaced to one or more other ("displaced") locations on the target device. According to an embodiment of the present invention, a user may specify that displacement of a module is desired when the module is to be moved to a different location on the target device, when the module is to be replicated and utilized at different locations on the target device, and/or when a placed and routed solution for a module that is pre-designed by another is to be implemented at a different location on the target device. If one or more modules in the system is to be displaced, control proceeds to 108. If one or more modules in the system is not to be displaced, control proceeds to 109.

At 108, the placement and routing solution for the one or more modules is relocated to the one or more displaced locations. According to an embodiment of the present invention, displacement options are identified for the user, and the placement and routing solution is translated in response to the displacement option selected by the user.

At 109, timing analysis is performed. According to an embodiment of the present invention, the timing analysis determines whether timing constraints of the system are satisfied. As part of timing analysis, slack analysis may be performed. It should be appreciated that the timing analysis procedure may be skipped and that control may proceed directly from procedure 108 to 110.

At 110, an assembly procedure is performed. The assembly procedure involves creating a data file that includes information determined by the procedures described at 101-109. The data file may be a bit stream that may be used to program a target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system, which may be used to program the target device according to the system design. It should be appreciated that the design of the system may also be output in other forms such as on a display device or other medium. The target device may be programmed with the data file. By programming the target with the data file, components on the target device are physically transformed to implement the system. It should be appreciated that aspects of the compiled design may be exported in whole or in part for use in the compilation of a different system that is being designed on a different computer system.

According to an embodiment of the present invention, the procedure illustrated in FIG. 1 may be implemented to displace a module while preserving a solution for the module. As a result, time required for re-compiling a design and for achieving timing closure is reduced or eliminated. Structural and physical regularities on the target device permits intelligent module updates while preserving timing. FIGS. 2-4 illustrate examples of how the compilation procedure described with reference to FIG. 1 may be utilized.

FIG. 2 illustrates an example of module displacement for floorplan relocation according to an embodiment of the present invention. In this example, modules A and B in design 210 have been placed and routed for optimal quality of results. However, at a later time, it is determined that logic B needs to be modified in structure and size. The user wishes to re-size and re-fit module B, but without affecting the solution to module A. The logic and placement and routing solution for module A is translated vertically as shown in design 220. Module A is displaced to allow for changes to B without requiring the recompilation and re-optimization of module A.

FIG. 3 illustrates an example of module displacement for module replication according to an embodiment of the present invention. In this example, module A in design 310 has been placed and routed for optimal quality of results. However, at a later time, it is determined that replicated copies of module A are desired. The logic and placement and routing solution of module A are replicated and translated to desired displaced locations as shown in design 320. This allows replicated instances of module A to be implemented in design 320 without requiring time to re-fit and re-optimize each instance of module A.

FIG. 4 illustrates an example of module displacement for IF export/import according to an embodiment of the present invention. In this example, module A in design 410 has been placed and routed for optimal quality of results on a specific target device. The design 410 is transmitted to a user for system integration. The user wishes to use the place and routed module A in a different design, design 420. However, module A needs to be moved to a different location to allow it to be implemented with other components in design 420. The logic and placement and routing solution for module A is translated to allow it to be implemented at the displaced location without requiring time to re-fit and re-optimize module A.

Figure 5:
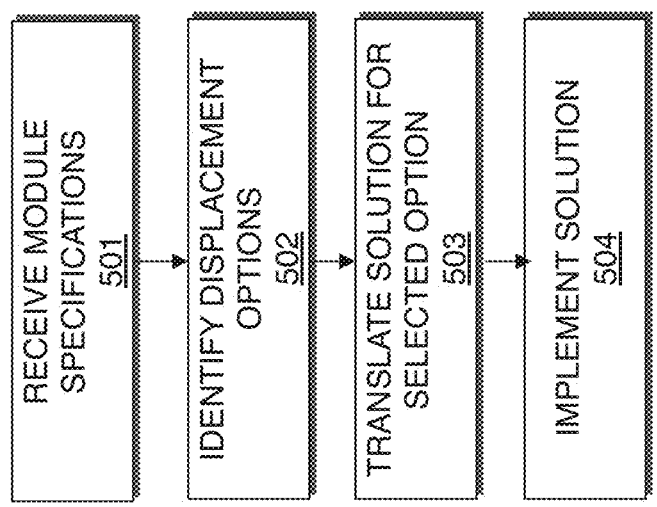
FIG. 5 is a flow chart illustrating a method for relocating a module according to an exemplary embodiment of the present invention.

FIG. 5 is a flow chart illustrating a method for relocating a module according to an exemplary embodiment of the present invention. The procedure illustrated in FIG. 5 may be performed at 105 and 108 in FIG. 1. At 501, specifications for a module to be displaced are received. The specification for the module may include the position of the module, the size of the module, and parameters for timing or variation of timing associated with the module, or other characteristics of the module. According to an embodiment of the present invention, the specifications may be provided by a user via a graphical user interface.

At 502, displacement options are identified. In response to the specifications for the module, displacement options are identified. According to an embodiment of the present invention, based upon the location and size of the module, other locations on the target device having resources similar to those at the location of the module are identified and output to the user. It should be appreciated that other criteria, such as parameters for timing or variation of timing allowed, may be used to further filter the displacement options. The displacement options for a particular module may be determined in real time or pre-computed. Displacement options for models of modules at different locations, sizes, and with different timing parameters may be pre-computed and stored on a table for look-up in order to speed-up the identification process.

At 503, a solution for the model is translated for a selected displacement option. In response to receiving a selected displacement option from a user, the placement and/or routing solution for the module is translated to allow the module to be displaced to the selected location. It should be appreciated that the selected location is a different location than the original location which the solution was based on, and that the selected location may be at a different horizontal and/or vertical position than the original location. According to an embodiment of the present invention, the translation is performed in response to receiving a preference that the placement and/or routing solution for the module is to be preserved after displacement.

At 504, the translated solution is implemented for the module. According to an embodiment of the present invention, placement and routing may be required for some components and connections directly associated with the original solution for the module in order to update their implementation in view of the displacement.

According to an embodiment of the present invention, the regular repeating structures of the target device are leveraged to perform an effective translation of an existing placement and routing solution. Target devices such as FPGAs have structural regularity which include repetition of equivalent device features. Floorplan blocks and connectivity in the routing fabric are designed to regularly repeat throughout the device. The target devices also have physical regularity which includes a repetition of physical properties such as timing regularity, typically in correspondence with the repetition of the equivalent device features. There is minimum variation of delays on equivalently repeating wires. This allows embodiments of the present invention to translate aspects of an initial solution for use at another location on the target device.

Figure 6:
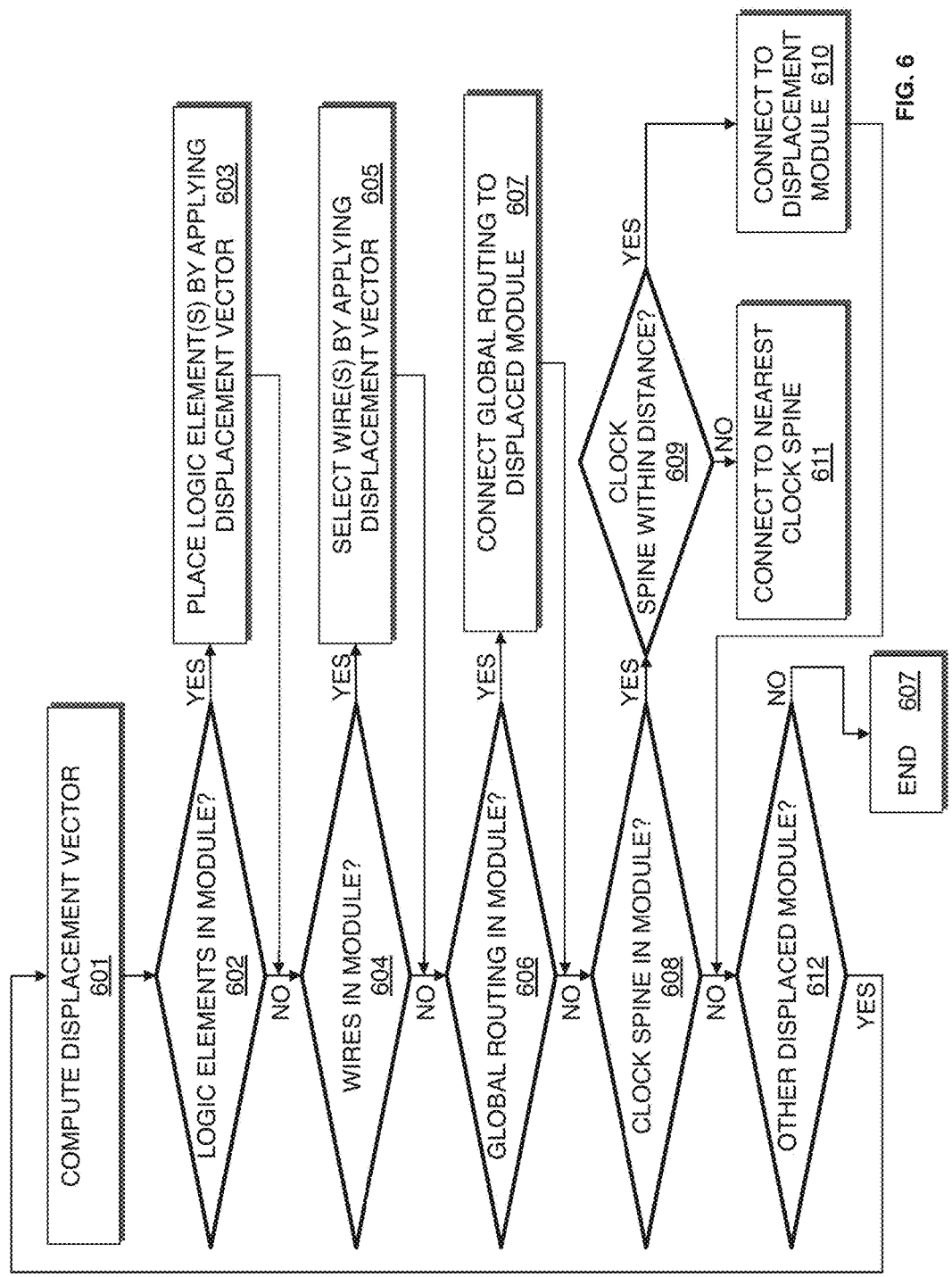
FIG. 6 illustrates a method for translating a solution for a module according to an exemplary embodiment of the present invention.

FIG. 6 illustrates a method for translating a solution for a module according to an exemplary embodiment of the present invention. The procedure illustrated in FIG. 6 may be performed at 503 in FIG. 5. At 601, a displacement vector is computed. According to an embodiment of the present invention, the displacement vector is computed from coordinates of a location of a displacement option selected by a user.

At 602, it is determined whether a logic element is implemented in the logic module to be displaced. If a logic element is implemented in the module to be displaced, control proceeds to 603. If a logic element is not implemented in the module to be displaced, control proceeds to 604.

At 603, each logic element implemented in the module is placed by applying the displacement vector. For example, if a solution for the module includes a logic element at coordinate $(x, y)$, the updated placement for the logic element would be $((x+a), (y+b))$, where the displacement vector is $(a, b)$.

At 604, it is determined whether any routing wire segments (horizontal or vertical routing wire segments) are implemented in the module to be displaced. If a routing wire segment is implemented in the module to be displaced, control proceeds to 605. If a routing wire segment is not implemented in the module to be displaced, control proceeds to 606.

At 605, for each routing wire segment implemented in the module and a new routing wire segment is selected for the displaced module by applying the displacement vector. For example, if a solution for the module includes a vertical or horizontal routing wire segment at coordinate (x, y), the new routing wire segment selected for the logic element would be at ((x+a), (y+b)), where the displacement vector is (a, b).

At 606, it is determined whether a global routing resource, such as a global clock network element, is implemented in the module to be displaced. If a global routing resource is implemented in the module to be displaced, control proceeds to 607. If a global routing resource is not implemented in the module to be displaced, control proceeds to 608.

At 607, the global routing resource is connected to the module to be displaced.

At 608, it is determined whether any clock spines are implemented in the module to be displaced. If a clock spine is implemented in the module to be displaced, control proceeds to 609. If a clock spine is not implemented in the module to be displaced, control proceeds to 612.

At 609, it is determined whether the clock spine is within a predetermined distance from the module to be displaced. If the clock spine is within a predetermined distance from the module to be displaced, control proceeds to 610. If the clock spine is not within a predetermined distance from the module to be displaced, control proceeds to 611.

At 610, the clock spine is connected to the module to be displaced.

At 611, the module to be displaced is connected to the nearest clock spine in its area.

At 612, it is determined whether there are other modules to be displaced that have yet to have their solution translated. If the solution for another displaced module is to be translated, control returns to 601. If no other solution needs to be translated, control terminates the procedure at 613.

FIGS. 1, 5 and 6 are flow charts that illustrate embodiments of the present invention. Some of the techniques illustrated may be performed sequentially, in parallel or in an order other than that which is described and that the procedures described may be repeated. It should be appreciated that not all of the techniques described are required to be performed, that additional techniques may be added, and that some of the illustrated techniques may be substituted with other techniques.

Figure 7A:
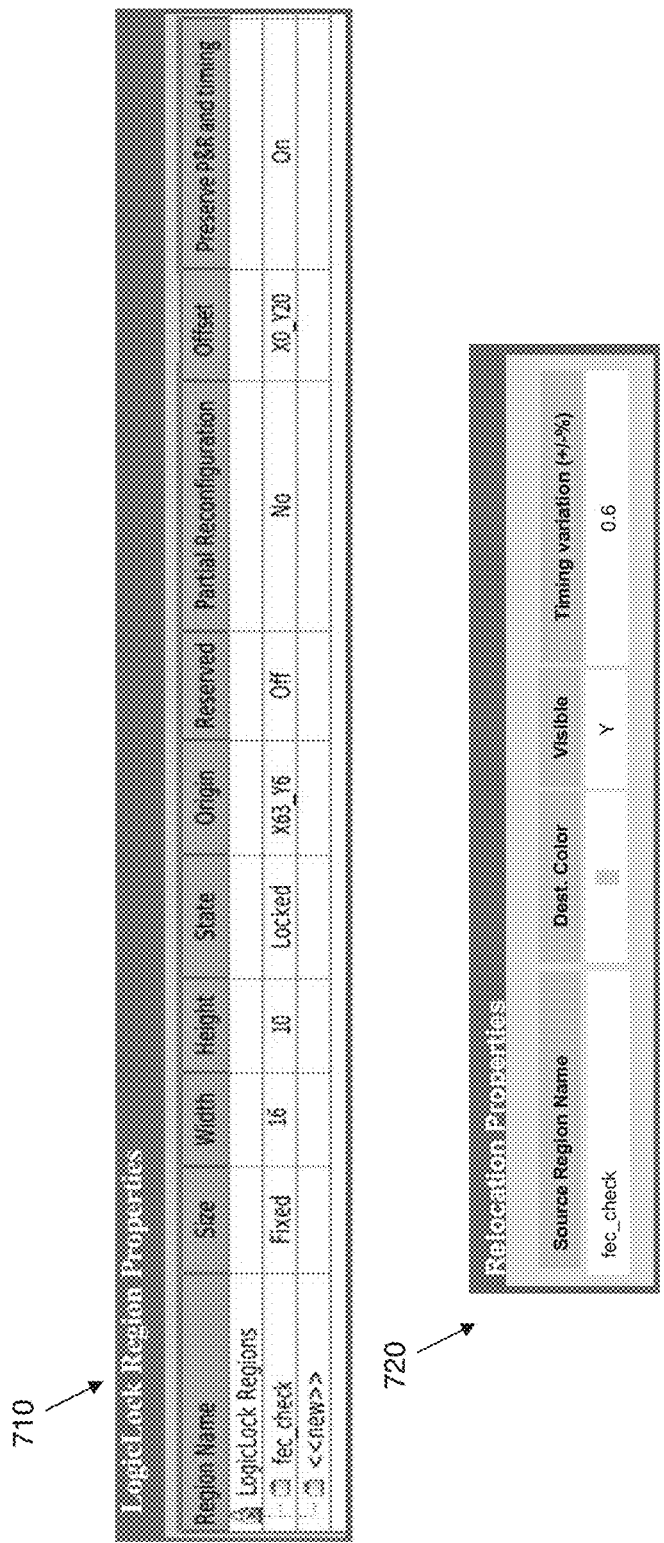
FIG. 7A and FIG. 7B illustrate examples of graphical user interfaces that allow a user to displace a module to a different location on a target device according to an exemplary embodiment of the present invention.
Figure 7B:
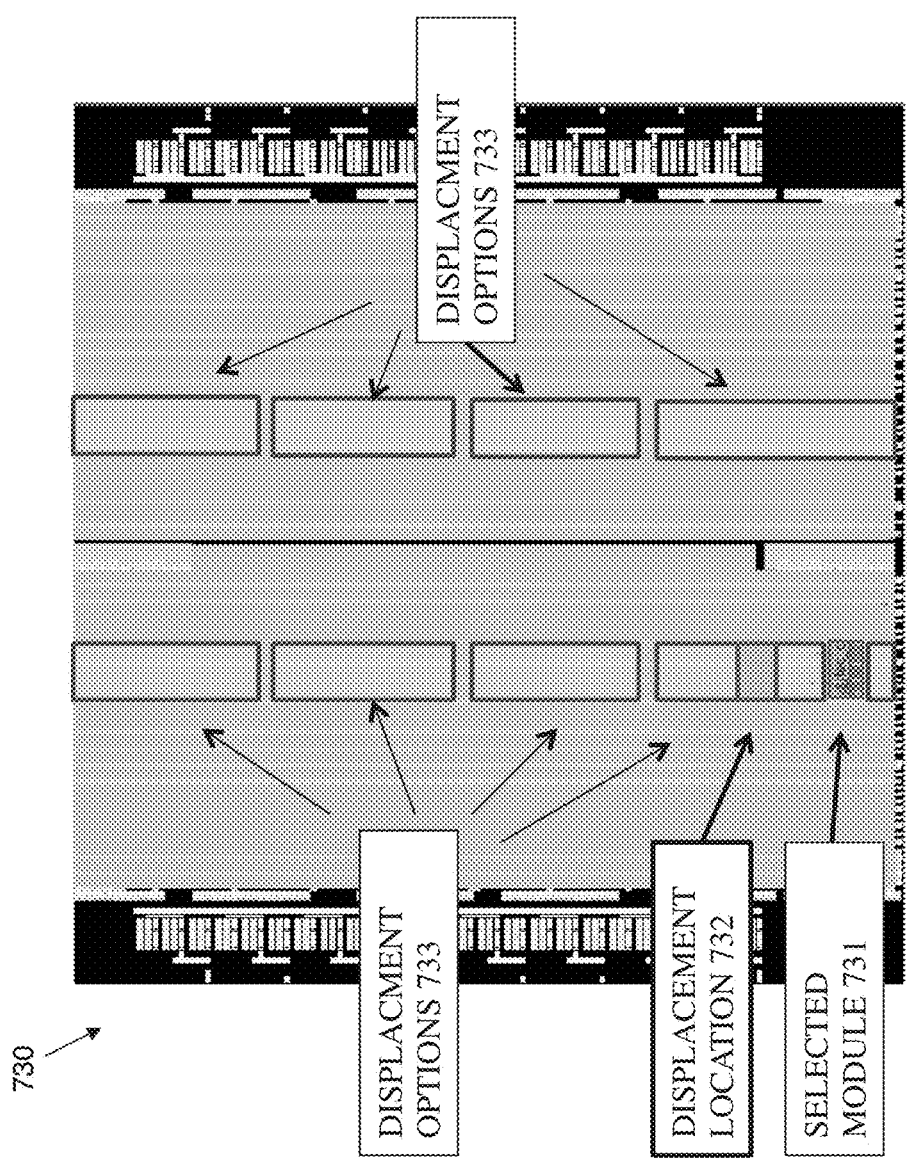

FIGS. 7A and 7B illustrate examples of a graphical user interface that allows a user to displace a module to a different location on a target device according to an exemplary embodiment of the present invention. FIG. 7A illustrates a first window 710 that allows specifications of a module to be displaced to be provided by a user. For example, the identity of the module (region name), dimensions of the module (width and height), and its location (origin) on the target device may be entered in fields of the first window 710. An indication that the user wishes for the module to utilize previously computed placement and routing solutions at the displaced location may also be specified (Preserve P&R and timing). FIG. 7A illustrates a second window 720 that allows a user to specify a timing variation that is permitted for the module at the displaced location, and a manner (destination color) in which displacement options are to be represented and displayed on a representation of the target device.

FIG. 7B illustrates a graphical representation of the target device 730. According to an embodiment of the present invention, the graphical representation of the target device 730 may be generated in response to the specifications entered into windows 710 and 720. The representation of the target device 730 highlights a selected module to be displaced 731 and a plurality of displacement options 733 where the module may be moved to based upon the dimensions of the module 731, timing variation entered, and the resources available on the target device. According to an embodiment of the present invention, from among the displacement options 733 presented, a user may select a displacement location 732 for the selected module 731. When a user selects the displacement location 732, the displacement location 732 may be highlighted on the graphical representation of the target device 730 and the offset coordinates of the module with respect to its original location may be automatically updated at the first window 710. Alternatively, if a user wishes to manually enter the location of the offset coordinates of a displacement location in the first window 710, the displacement location may be automatically highlighted on the graphical representation of the target device 730 at 732. Upon receiving confirmation of the desired displacement selections, a translation of the place and route solution for module 731 at displacement location 732 may be computed.

Figure 8:
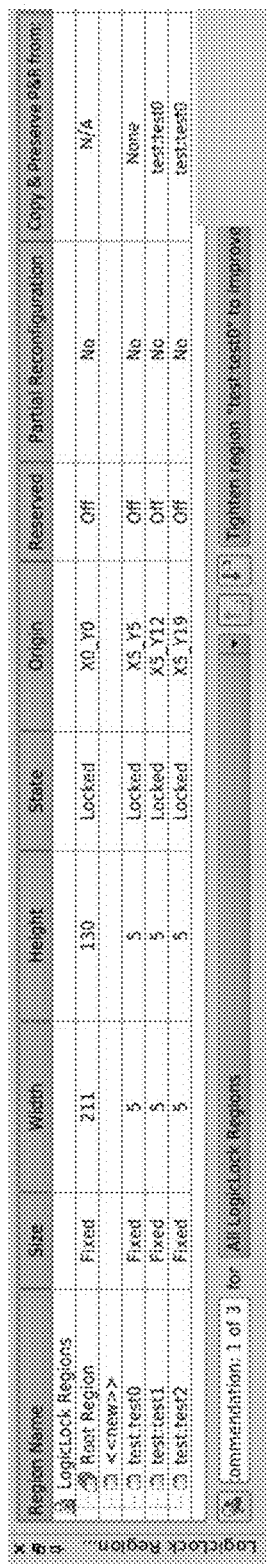
FIG. 8 illustrates an example of a graphical user interface that allows a user to replicate a module according to an exemplary embodiment of the present invention.

FIG. 8 illustrates an example of a graphical user interface that allows a user to replicate a module according to an exemplary embodiment of the present invention. The graphical user interface illustrated in FIG. 8 may be used together with windows 710 and 720 in FIG. 7A and the graphical representation of a target device in FIG. 7B to replicate a module. FIG. 8 illustrates a window 810 that allows specifications of a module to be displaced and/or replicated to be provided by a user. For example, the identity of the module (region name), dimensions of the module (width and height), and its location (origin) on the target device may be entered in fields of window 810. An indication that the user wishes for replicated module to utilize previously computed placement and routing solutions for the original module may also be specified (Copy & Preserve P&R from). The second window 720 from FIG. 7A may be used to by a user to specify a timing variation that is permitted for the module at the displaced location, and a manner (destination color) in which displacement options are to be represented and displayed on a representation of the target device such as the one illustrated in FIG. 7B.

In this example, a module "test" with instance name "test0" is replicated, and the copies are given the instance names "test1" and "test2". An indication is given by the user that the replicated modules are to use the place and route solutions from "test0". Upon selecting the displacement options for module "test1" and "test2" from a representation of the target device, the coordinates of the origin of "test1" and "test2" may be reflected in fields of window 810. Upon confirming the desired displacement selections, a translation of the place and route solution for modules "test1" and "test2" may be computed.

Figure 9:
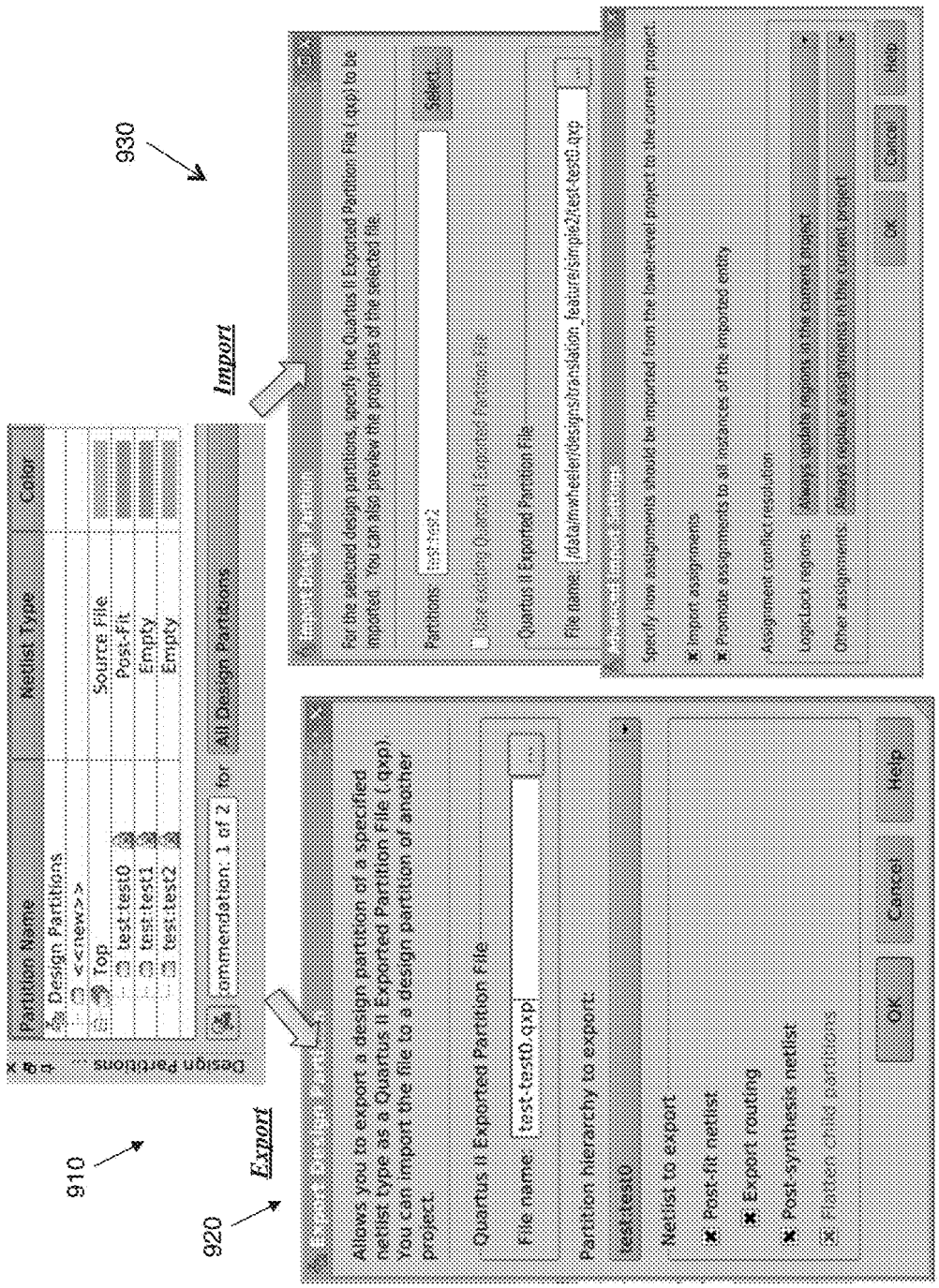
FIG. 9 illustrates an example of a graphical user interface that allows a user to deliver a module that is a part of firm IP according to an exemplary embodiment of the present invention.

FIG. 9 illustrates an example of a graphical user interface that allows a user to export and import solutions or a module according to an exemplary embodiment of the present invention. FIG. 9 illustrates a first window 910 that displays the identity of a plurality of modules. In one example, module "test0" has a post-fit solution that includes placement and routing. Upon selecting module "test0" from the first window 910, a second window 920 becomes available. The second window 920 may be utilized to allow a user to export the solution for module "test0". A file name may be created for the solution for the module, and specific netlists for the module may be selected. Option may be visible to allow explicit specification that the placement and routing solution is to be exported.

In another example, module "test2" does not have a placement or routing solution. Upon selecting module "test2" from the first window 910, a third widow 930 becomes available. The third window 930 may be utilized to allow a user to import a solution for module "test2". As shown in window 930, the file name of a solution for module "test0" may be inputted to allow module "test2" to utilize the solution for module "test0". The properties of the selected imported solution is displayed.

Figure 10:
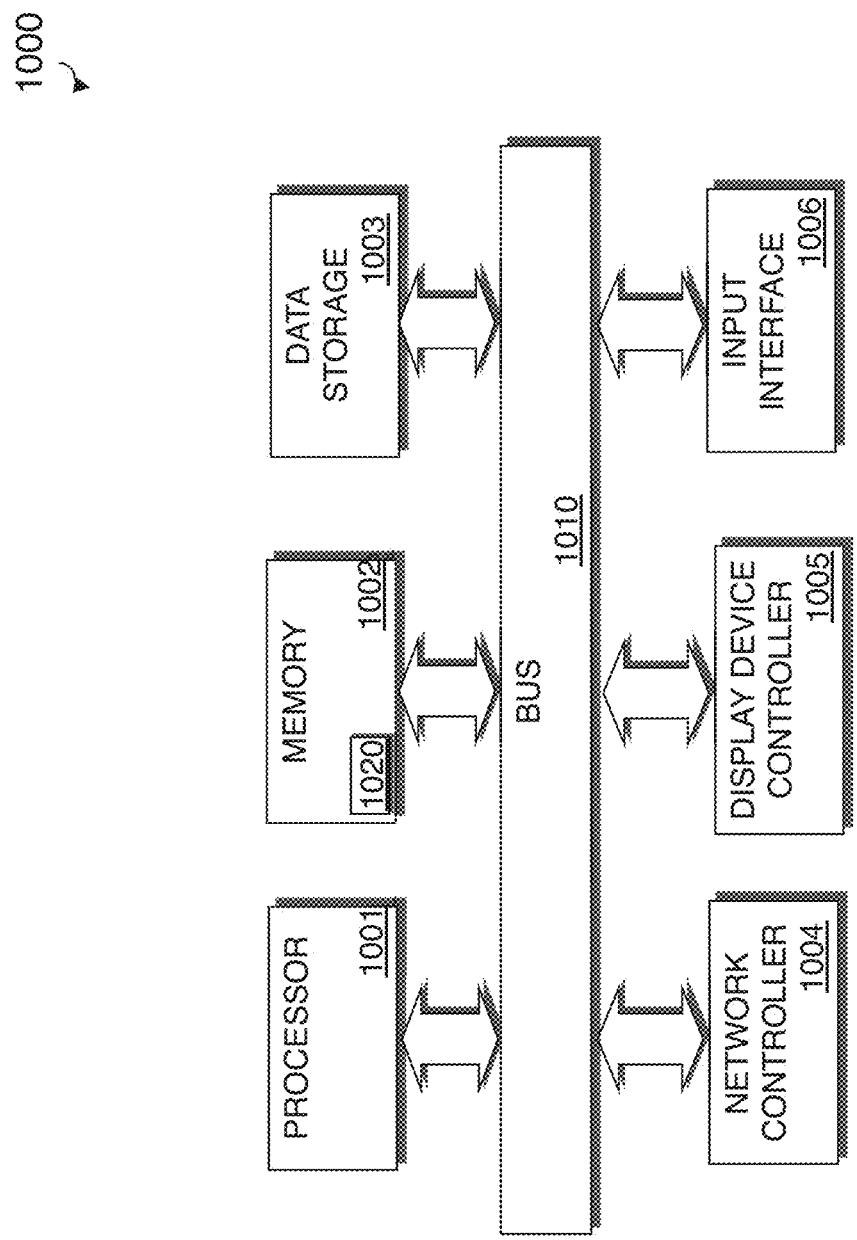
FIG. 10 illustrates a block diagram of a computer system implementing a system designer according to an embodiment of the present invention.

FIG. 10 is a block diagram of an exemplary computer system 1000 in which an example embodiment of the present invention resides. The computer system 1000 may be used to implement a system designer such as an EDA tool. The computer system 1000 includes a processor 1001 that processes data signals. The processor 1001 is coupled to a bus 1010 that transmits data signals between components in the computer system 1000. The bus 1010 may be a single bus or a combination of multiple buses. The computer system 1000 includes a memory 1002. The memory 1002 may be a dynamic random access memory device, a static random access memory device, and/or other memory device. The memory 1002 may store instructions and code represented by data signals that may be executed by the processor 1001. A data storage device 1003 is coupled to the bus 1010. The data storage device 1003 may be a hard disk drive, a floppy disk drive, a CD-ROM device, a flash memory device or other mass storage device.

A network controller 1004 is coupled to the bus 1010. The network controller 1004 may link the computer system 1000 to a network of computers (not shown) and supports communication among the machines. A display device controller 1005 is coupled to the bus 1010. The display device controller 1005 allows coupling of a display device (not shown) to the computer system 1000 and acts as an interface between the display device and the computer system 1000. An input interface 1006 is coupled to the bus 1010. The input interface 1006 may be, for example, a keyboard and/or mouse controller or other input interface. The input interface 1006 allows coupling of an input device to the computer system 1000 and transmits data signals from an input device to the computer system 1000. It should be appreciated that computer systems having a different architecture or having different components may also be used to implement the computer system 1000.

According to an embodiment of the present invention, a system designer 1020 may reside in memory 1002 and be executed by the processor 1001. The system designer 1020 may operate to compile a design for a system on a target device. The system designer 1020 may also utilize an existing solution for placement and/or routing of a module to be displaced without requiring the entire design to be re-compiled. The existing solution for placement and/or routing of the module is translated by the system designer 1020 for the relocation of the module by leveraging the principles of structural regularity and physical regularity of the target device. As a result, time required for re-compiling a design and for achieving timing closure is reduced or eliminated. Furthermore, timing variation across instances of replicated modules may be reduced.

Figure 11:
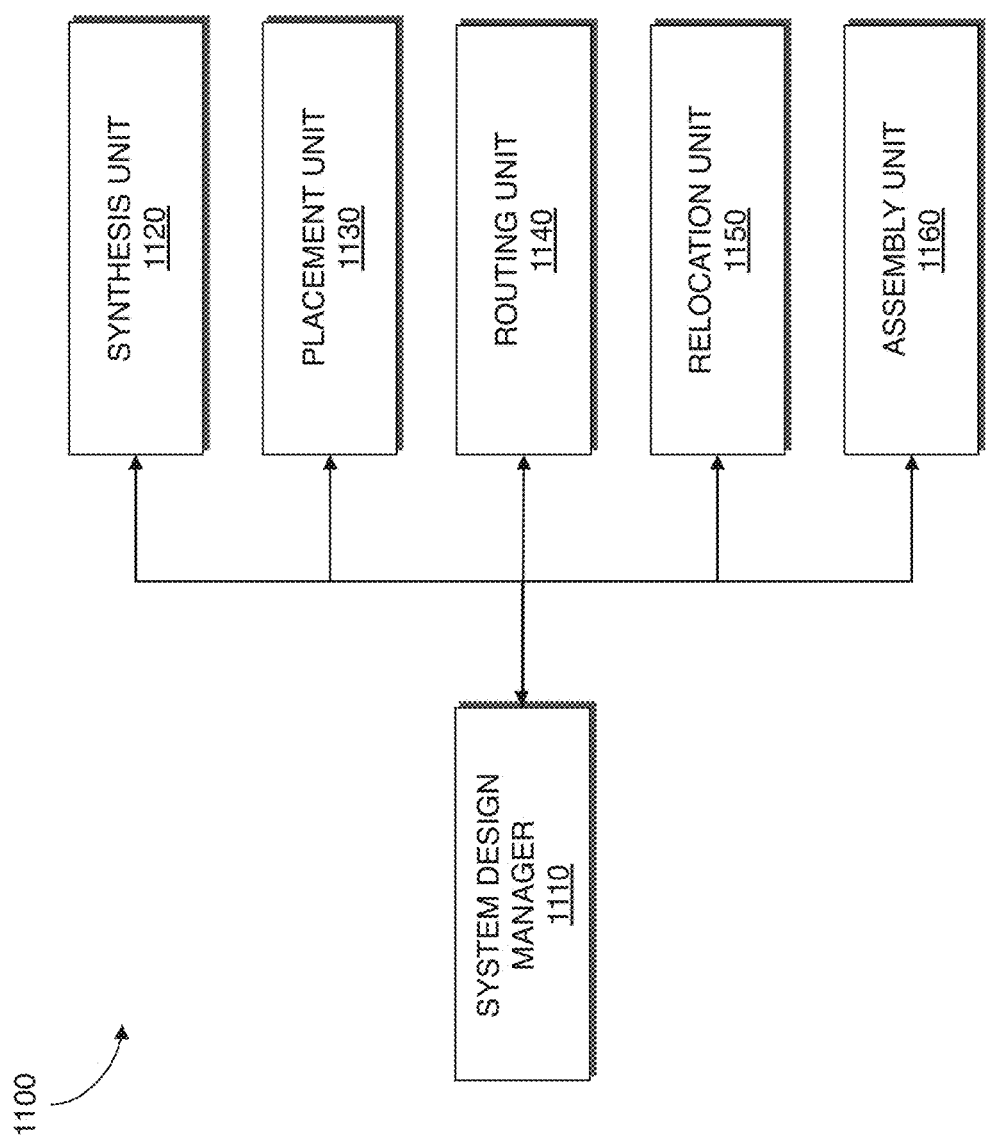
FIG. 11 illustrates a block diagram of a system designer according to an embodiment of the present invention.

FIG. 11 illustrates a system designer 1100 according to an embodiment of the present invention. The system designer 1100 may be an EDA tool for designing a system on a target device such as an FPGA, structured application-specific integrated circuit (ASIC), ASIC, or other circuitry. FIG. 11 illustrates modules implementing an embodiment of the system designer 1100. According to one embodiment, the modules represent software modules and system design may be performed by a computer system such as the one illustrated in FIG. 10 executing sequences of instructions represented by the modules shown in FIG. 11. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 1100 includes a system design manager 1110. The system design manager 1110 is connected to and transmits data between the other components of the system designer 1100. The system design manager 1110 provides an interface that allows a user to input data into the system designer 1100. According to an embodiment of the present invention, a description of a system may be input into the system designer 1100 by the user. The description of the system may be in HDL format provided by the user or by another tool. The description may include components defined by user generated logic ("user logic"). The description may also or alternatively include pre-designed logic in the system. According to an embodiment of the present invention, the system design manager 1110 may implement the graphical user interfaces described with reference to FIGS. 7A, 7B, 8, and 9.

The system designer 1100 includes a synthesis unit 1120. The synthesis unit 1120 generates a logic design of the system to be implemented by the target device. According to an embodiment of the present invention, the synthesis unit 1120 generates an optimized logical representation of the system from the HDL design definition and maps the optimized logic design. According to an embodiment of the present invention, a netlist is generated from mapping. This netlist may be an optimized technology-mapped netlist generated from the HDL.

The system designer includes a placement unit 1130. According to an embodiment of the present invention, the placement unit 1130 places the mapped logical system design on the target device. Placement works on the technology-mapped netlist to produce a placement for each of the functional blocks. According to an embodiment of the present invention, placement unit 1130 fits the system on the target device by determining which resources on the logic design are to be used for specific logic elements, and other function blocks determined to implement the system as determined during synthesis. Placement may include clustering which involves grouping logic elements together to form the logic clusters present on the target device.

The system designer 1100 includes a routing unit 1140 which routes the placed design on the target device. The routing unit 1140 allocates routing resources on the target device to provide interconnections between logic gates, logic elements, and other components on the target device. The routing unit 1140 may also perform routability optimization on the placed logic design.

The system designer 1100 includes a relocation unit 1150. Upon making a determination that one or more modules in the system is to be displaced to one or more other ("displaced) locations on the target device, the relocation unit 1150 relocates the placement and/or routing solution for the one or more modules. According to an embodiment of the present invention, displacement options are identified for the user, and the placement and routing solution is translated in response to the displacement option selected by the user. A user may specify that displacement of a module is desired when the module is to be moved to a different location on the target device, when the module is to be replicated and utilized at different locations on the target device, and/or when a placed and routed solution for a module that is pre-designed by another is to be implemented at a different location on the target device. The relocation unit 1150 may perform the procedures described with reference to FIGS. 5 and 6.

The system designer 1100 includes an assembly unit 1160 that performs an assembly procedure that creates a data file that includes the design of the system generated by the system designer 1100. The data file may be a bit stream that may be used to program the target device. The assembly unit 1160 may output the data file so that the data file may be stored or alternatively transmitted to a separate machine used to program the target device. It should be appreciated that the assembly unit 1160 may also output the design of the system in other forms such as on a display device or other medium.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 12:
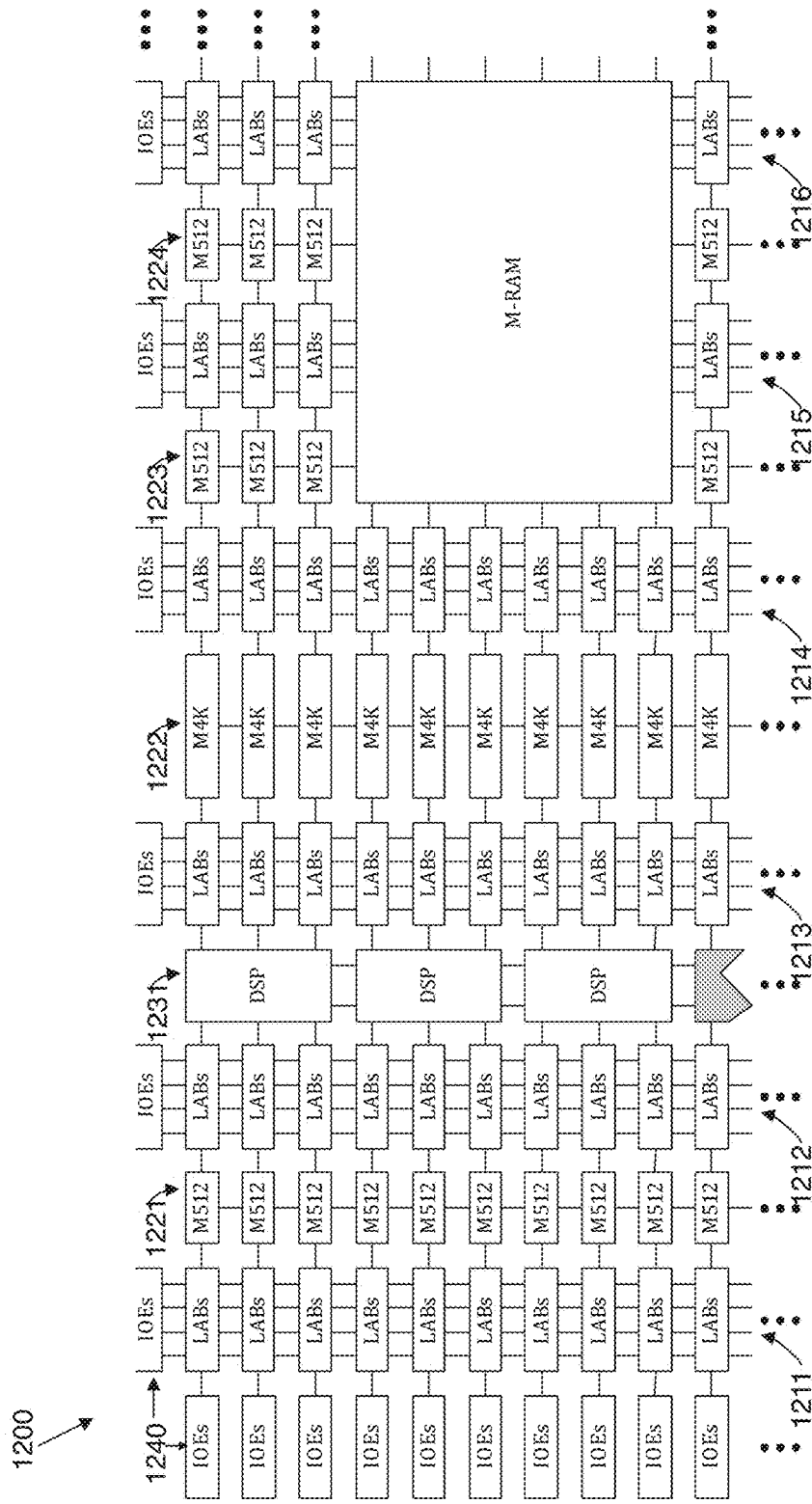
FIG. 12 illustrates an exemplary target device according to an embodiment of the present invention.

FIG. 12 illustrates a device 1200 that may be used to implement a target device according to an embodiment of the present invention. The device 1200 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1200. Columns of LABs are shown as 1211-1216. It should be appreciated that the logic block may include additional or alternate components.

The device 1200 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1200. Columns of memory blocks are shown as 1221-1224.

The device 1200 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1200 and are shown as 1231.

The device 1200 includes a plurality of input/output elements (IOEs) 1240. Each IOE feeds an IO pin (not shown) on the device 1200. The IOEs 1240 are located at the end of LAB rows and columns around the periphery of the device 1200. Each IOE may include a bidirectional IO buffer and a plurality of registers for registering input, output, and output-enable signals.

The device 1200 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method, comprising:
compiling a first circuit design;
performing a placement of the first circuit design on a programmable logic device at a first location;
performing an optimization of the placed first circuit design to generate a design optimization;
preserving the design optimization of the placed first circuit design after the optimization; and
applying the design optimization on a placed design of the first circuit design at a second location.

2. The method of claim 1, wherein the design optimization comprises a physical design optimization.

3. The method of claim 1, wherein the design optimization is preserved in a script file interpretable by an electronic design automation tool.

4. The method of claim 1, wherein applying the design optimization on the placed design of the first circuit design comprises a placement change of a portion of the first circuit design.

5. The method of claim 1, wherein the design optimization comprises a clock path, a timing optimization, a routing optimization, a placement optimization, or any combination thereof.

6. The method of claim 1, wherein applying the design optimization on the placed design comprises referencing a displacement option.

7. The method of claim 6, wherein the displacement option comprises an indication of a relocation of the circuit design based on an existing placement of the circuit design.

8. The method of claim 6, wherein the displacement option comprises a specification setting configured to indicate a fanout optimization, logical rewiring optimization, a clock optimization, a placement optimization, or any combination thereof.

9. The method of claim 1, comprising:
routing the first circuit design on the programmable logic device at the first location using a first portion of routing and a second portion of routing; and
routing the placed design of first circuit design at the second location using the first portion of routing.

10. The method of claim 1, comprising operating processing circuitry to cause physical configuration of the programmable logic device based at least in part on a result from applying the design optimization on the placed design of the first circuit design at the second location.

11. A tangible, non-transitory computer readable medium including a sequence of instructions stored thereon for causing a computer to execute a method, wherein the instructions comprise instructions to:
place a first circuit design on a programmable logic device based on design optimizations generated in response to a previous compiling of the first circuit design;
compile the first circuit design;
preserve a design optimization of the placed first circuit design after an optimization; and
apply the design optimization on a placed design of the first circuit design at a second location.

12. The non-transitory machine-readable medium of claim 11, wherein the design optimization comprises a timing preservation.

13. The non-transitory machine-readable medium of claim 11, comprising instructions to perform an additional fanout optimization of the placed design based on an initial fanout optimization corresponding to the design optimization.

14. The non-transitory machine-readable medium of claim 11, comprising instructions to perform an additional placement optimization based on an initial placement optimization corresponding to the design optimization.

15. The non-transitory machine-readable medium of claim 11, comprising instructions to configure a physical programmable logic device based on a result from applying the design optimization on the placed design of the first circuit design at the second location.

16. The non-transitory machine-readable medium of claim 11, comprising instructions to reference a displacement option specified by a user.

17. The non-transitory machine-readable medium of claim 16, wherein the displacement option comprises a fanout optimization indication, logical rewiring optimization indication, a clock optimization indication, a placement optimization indication, or any combination thereof.

18. A tangible, non-transitory, machine-readable media storing instructions executable by one or more processors of an electronic device, wherein the instructions comprise instructions to:
perform an optimizing action on a first circuit design;
perform a placement of the first circuit design on a programmable logic device at a first location;
perform a physical optimization of the placed first circuit design to generate a design optimization;
preserve the design optimization of the placed first circuit design after the optimization; and
apply the design optimization on a placed design of the first circuit design at a second location.

19. The machine-readable media of claim 18, wherein the optimizing action is configured to generate a netlist corresponding to the first circuit design, and wherein the placement of the first circuit design on the programmable logic device at the first location is based at least in part on the netlist.

20. The machine-readable media of claim 18, wherein the design optimization comprises a placement preservation, a routing preservation, a timing preservation, or any combination thereof.

21. A method, comprising:
compiling a first circuit design;
performing a placement of the first circuit design on a programmable logic device at a first location;
performing a modification of the placed first circuit design to generate a design modification;
preserving the design modification of the placed first circuit design after the modification; and
applying the design modification on a placed design of the first circuit design at a second location.

22. The method of claim 21, wherein performing the modification includes performing a fanout optimization.

* * * * *